A. FAY.
VARIABLE SPEED MECHANISM.
APPLICATION FILED DEC. 26, 1911.
1,145,236.
Patented July 6, 1915.
8 SHEETS—SHEET 2.
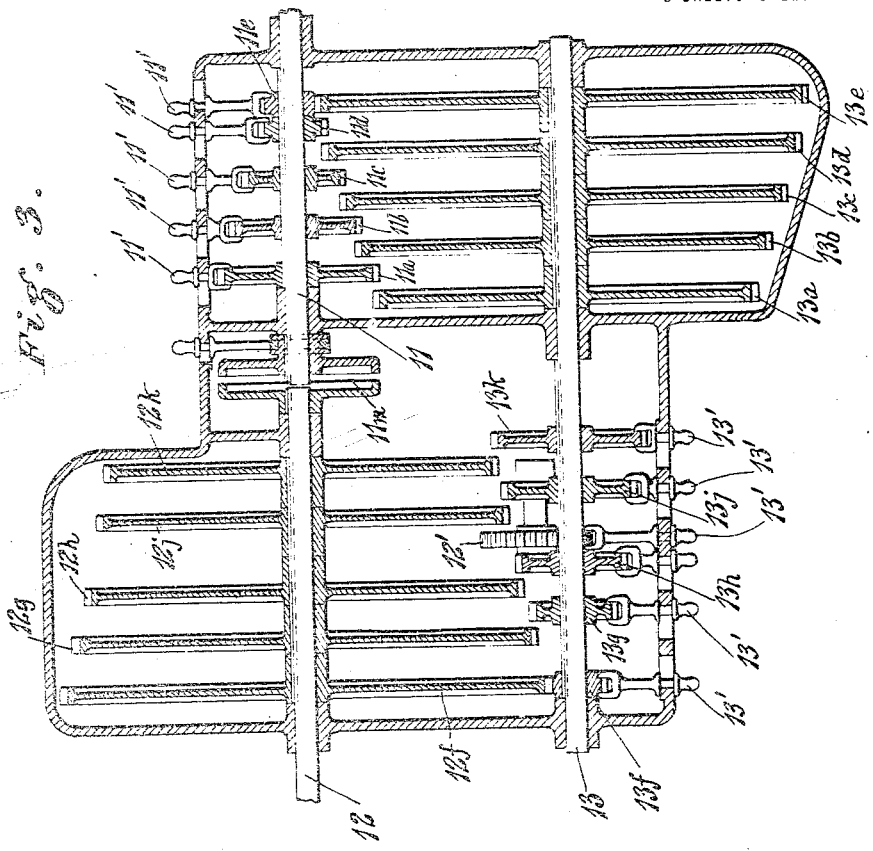
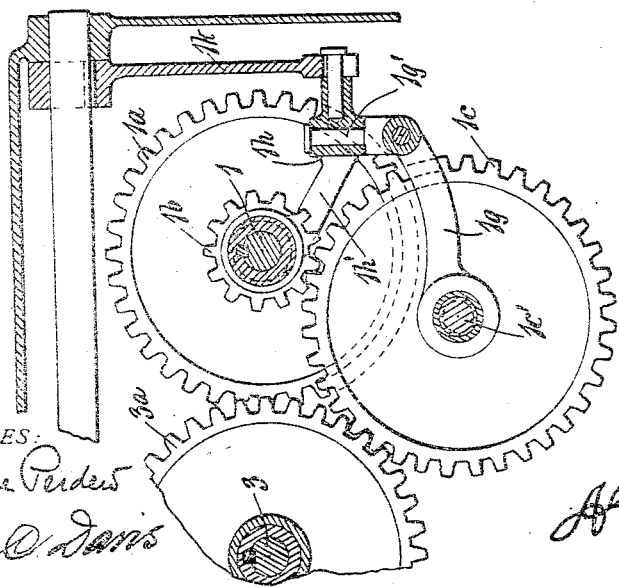
WITNESSES:
INVENTOR.

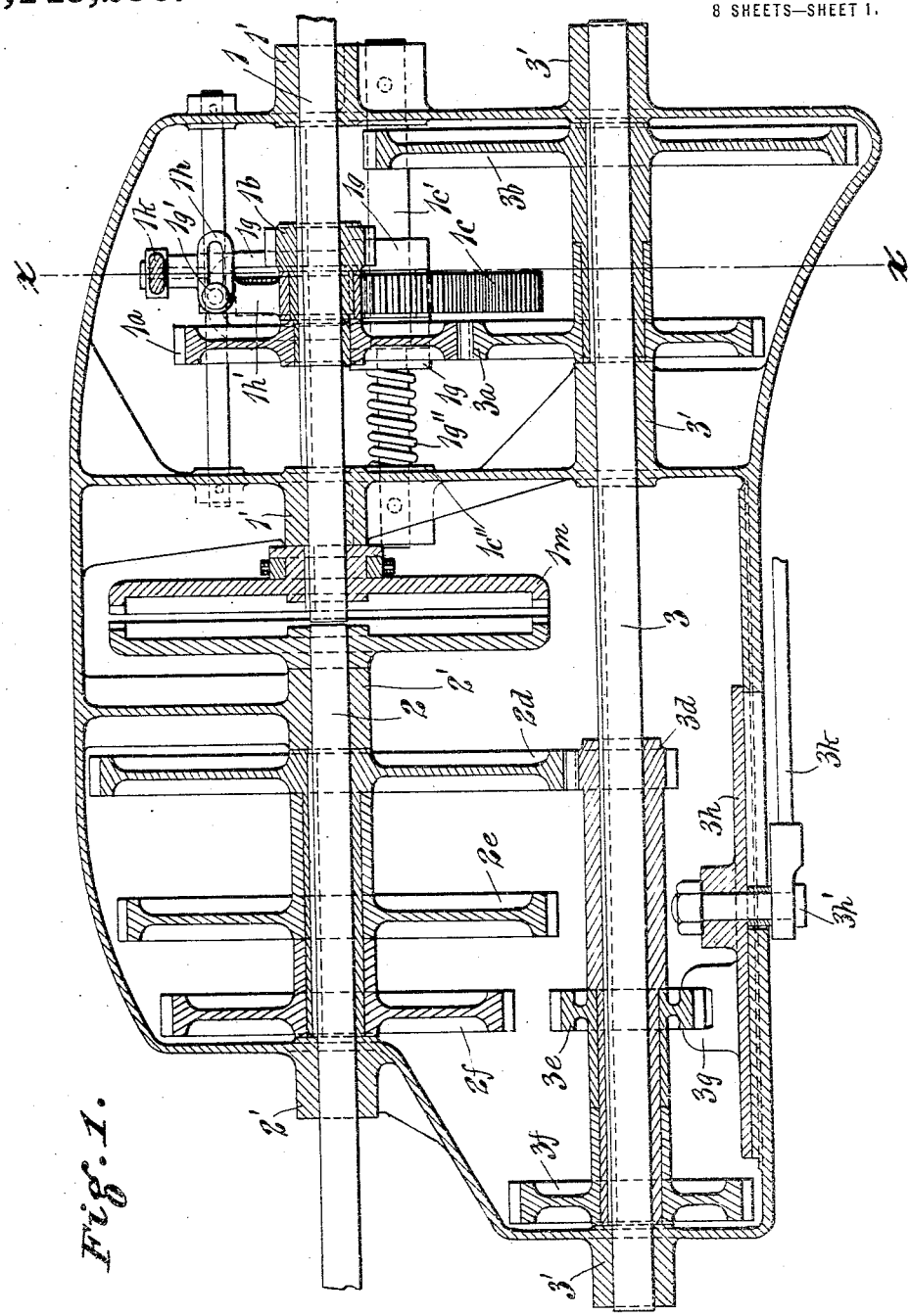

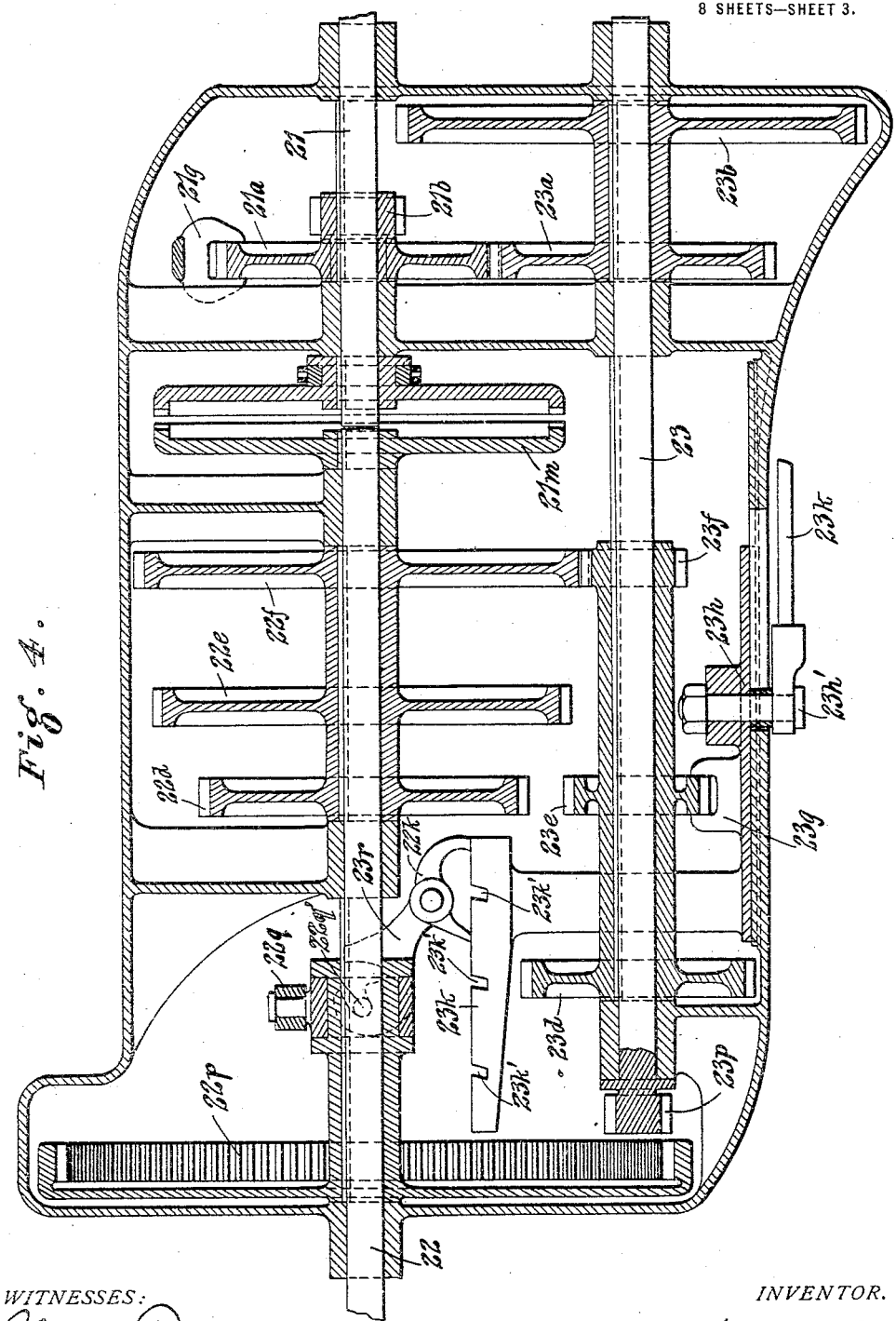

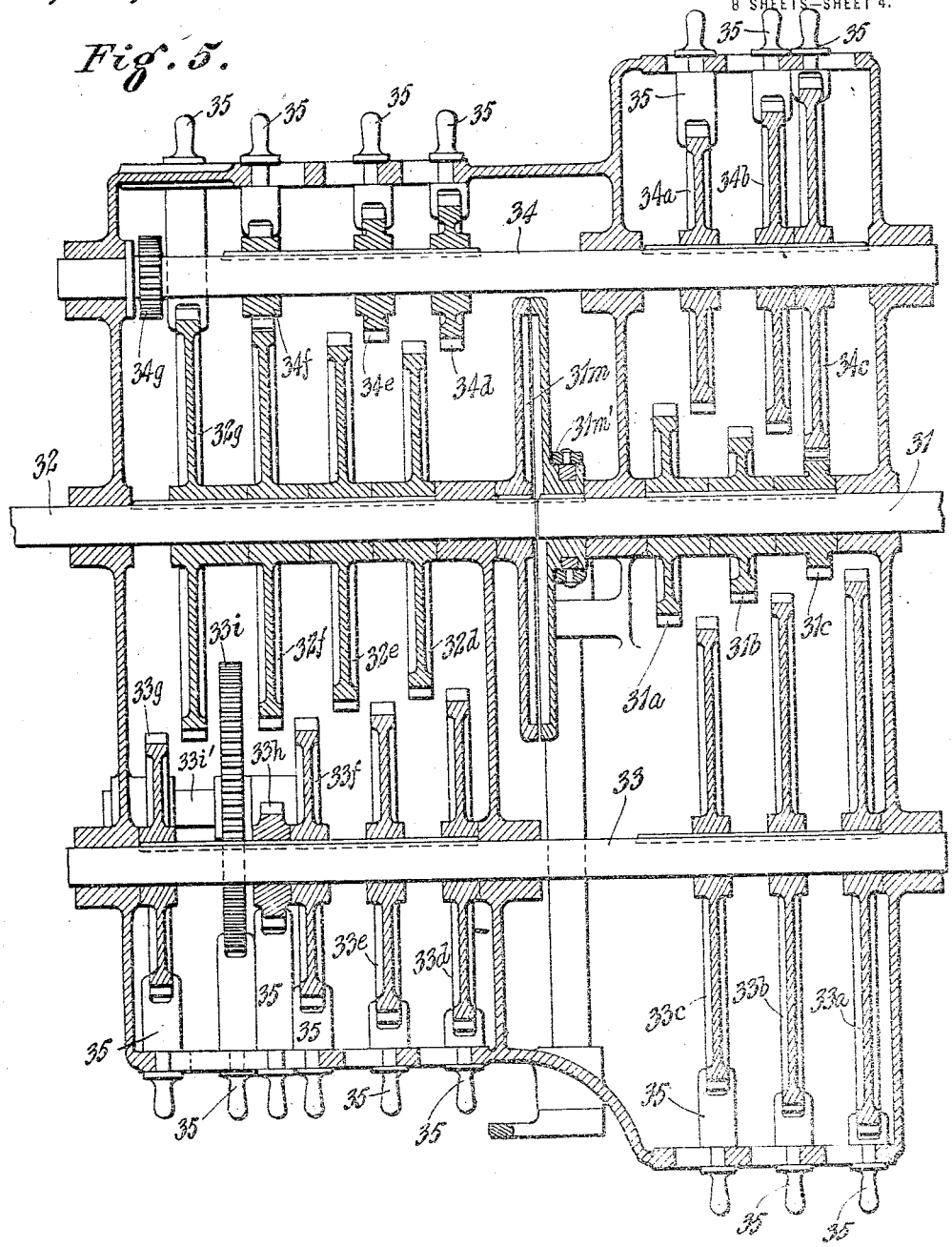

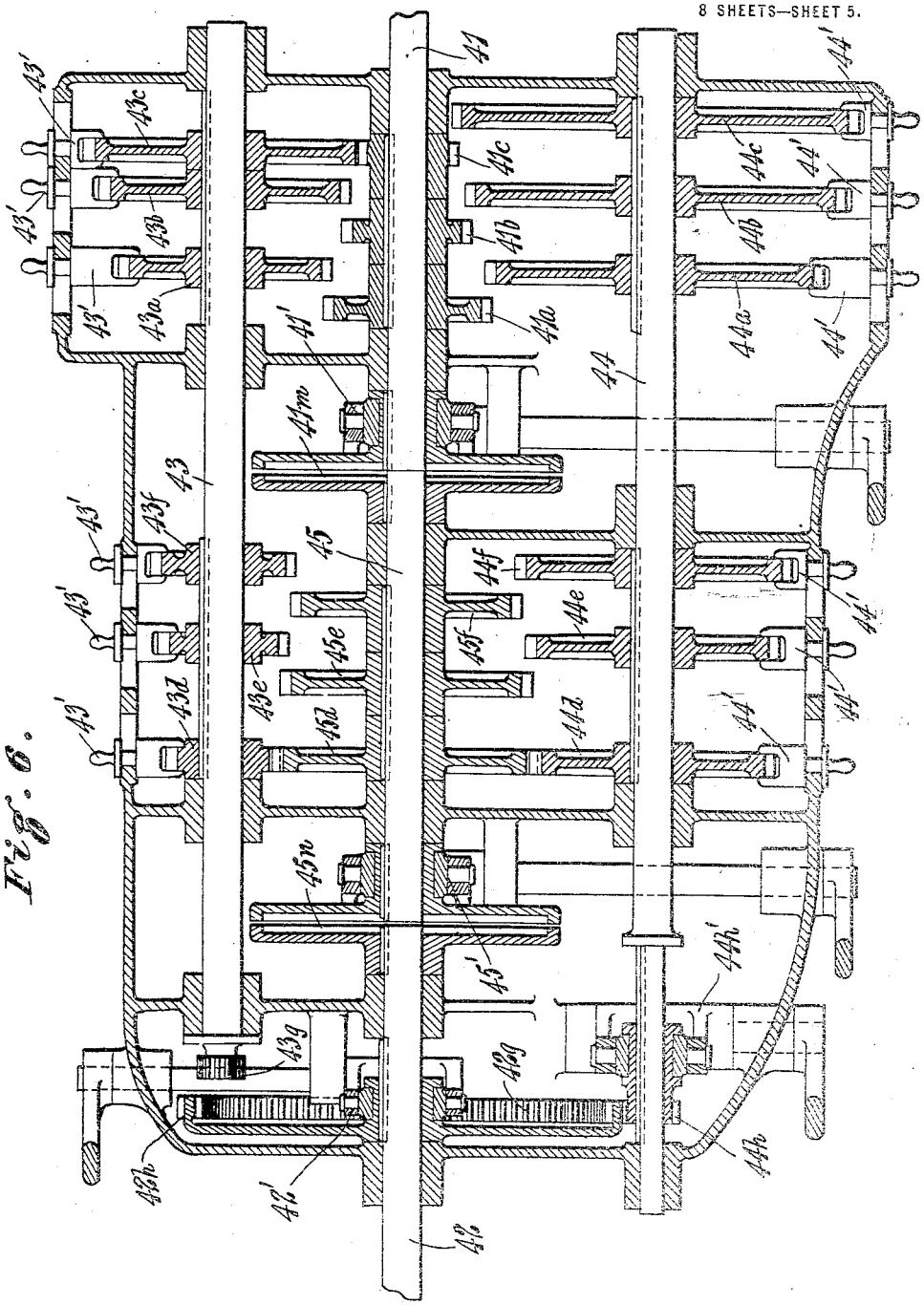

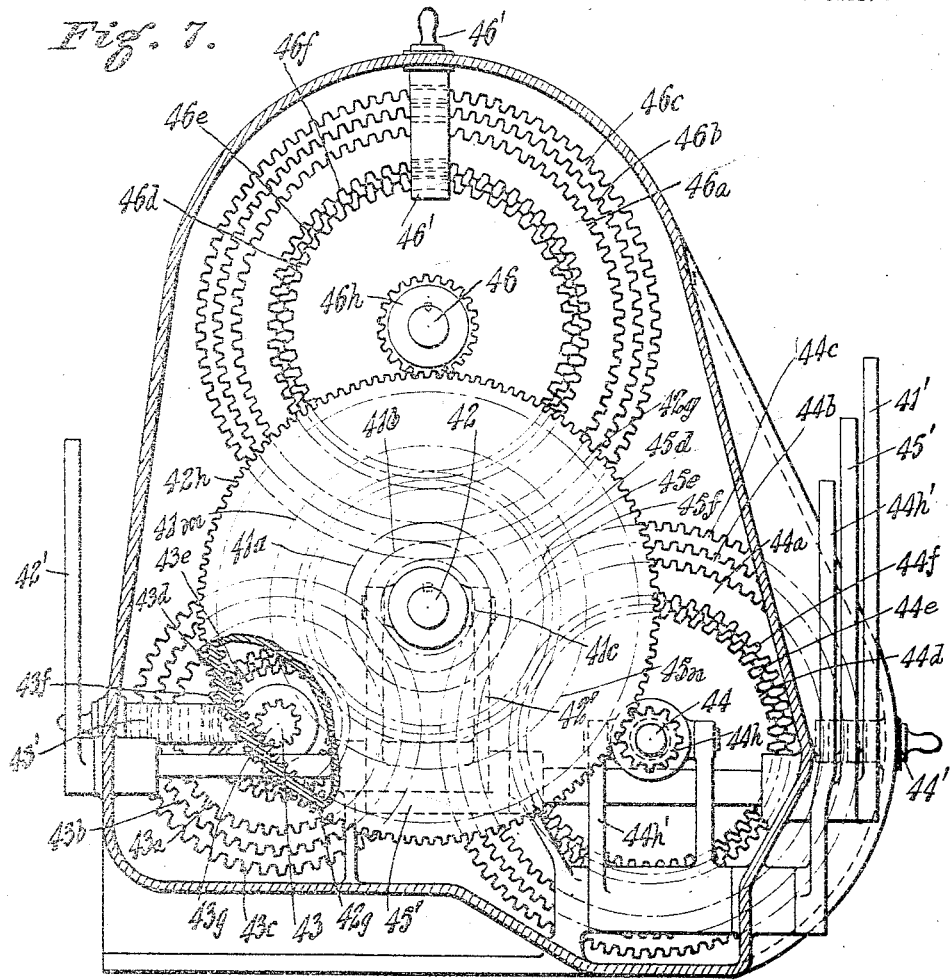
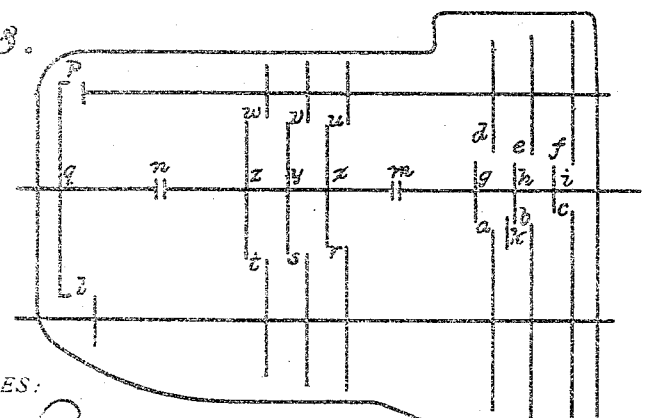

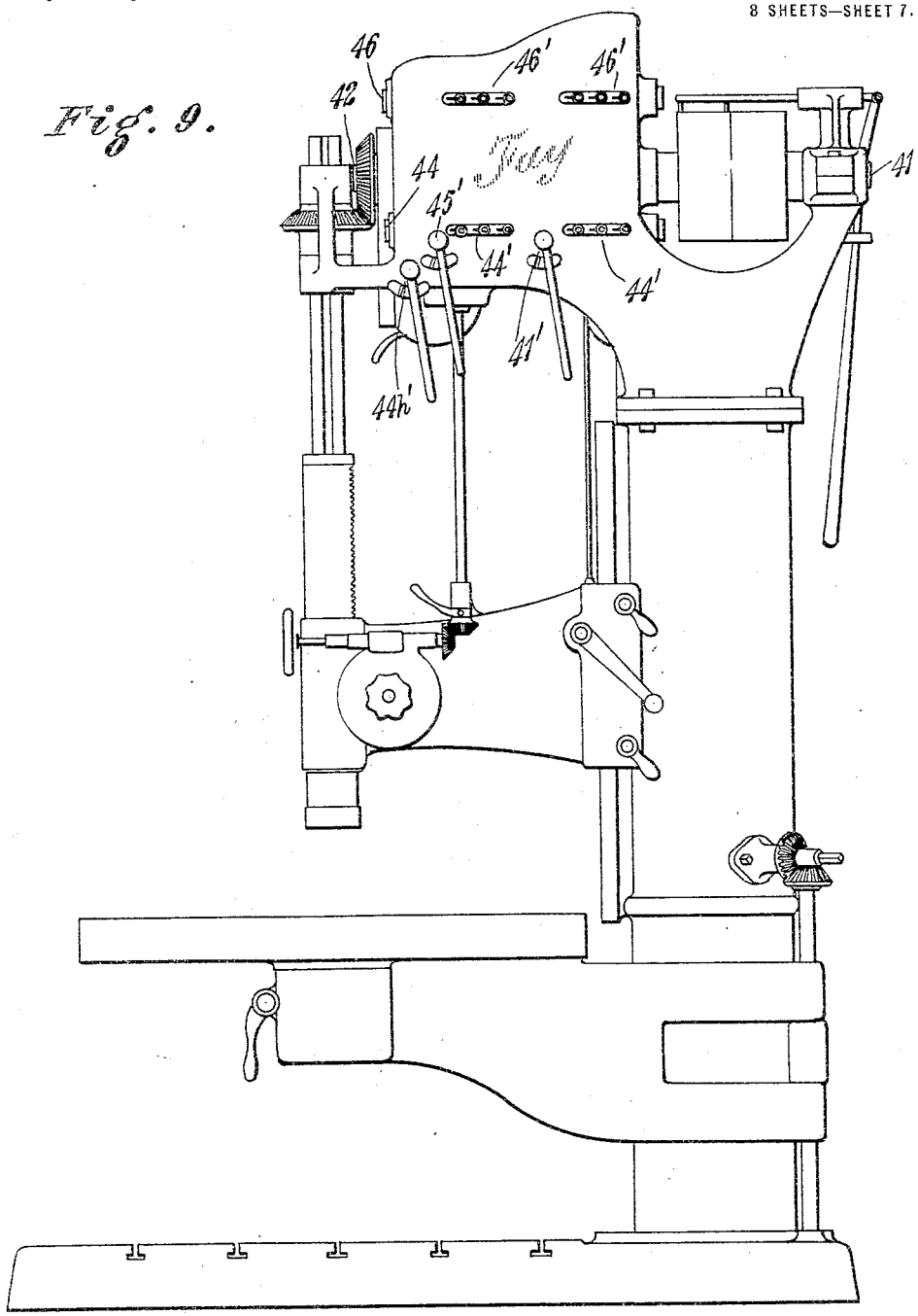

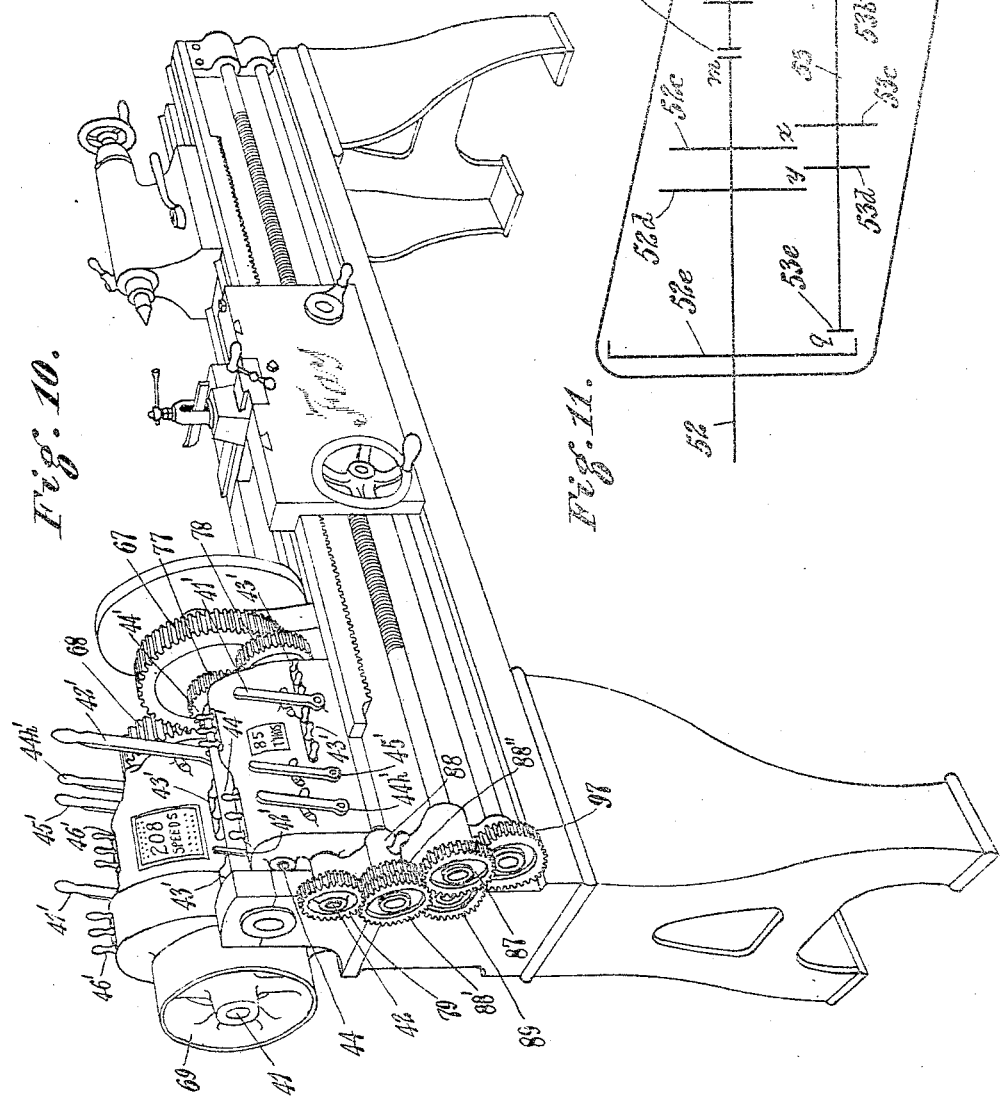

UNITED STATES PATENT OFFICE.

ALPHEUS FAY, OF LOUISVILLE, KENTUCKY.

VARIABLE-SPEED MECHANISM.

1,145,236.  Specification of Letters Patent.  Patented July 6, 1915.

Application filed December 26, 1911. Serial No. 667,780.

*To all whom it may concern:*

Be it known that I, ALPHEUS FAY, a citizen of the United States, residing at Louisville, in the county of Jefferson and State of Kentucky, have invented a certain new and useful Variable-Speed Mechanism, of which the following is a specification.

My invention relates to gearing, and has for its object the attainment of increased number of variations of speed, as transmitted from a driving to a driven means, while avoiding objectionable increase in the number of operating parts.

The further object of my invention is to obtain reversal of the motion through such speed-varying means, and, by simple means, to provide increased number of speed variations in such reverse motion.

My invention consists in the parts, and in the details of construction and arrangement of parts, as will hereinafter be more fully described and claimed.

In the drawings: Figure 1 is a sectional view of a mechanism embodying my invention, in which seven forward speeds and three reverse speeds may be obtained, the reversal being obtained through an idler. Fig. 2 is a partial cross section on the line $x$—$x$ of Fig. 1, better illustrating the idler and the means for its manipulation. Fig. 3 is a sectional view of a device, similar to that shown in Figs. 1 and 2, but having more gears, by which twenty-six forward and five reverse speeds are obtained. Fig. 4 is a sectional view of a device for obtaining the reverse motion through an internal gear, and affording seven forward speeds and two reverse speeds, a means for preventing the locking of the gears being included. Fig. 5 is a sectional view of a device similar to those shown in Figs. 1, 2 and 3, but having two lay shafts, by means of which twenty-five forward and six reverse speeds are obtained. Fig. 6 is a sectional view of a device, having an internal gear for obtaining the reverse motion, like Fig. 4 illustrates, but having two lay shafts, similar to the device shown in Fig. 5, by which fifty-two forward and thirty-three reverse speeds may be obtained. Fig. 7 is a sectional end elevation illustrating a device similar to that shown in Fig. 6, but having three lay shafts, so that one hundred and forty-eight forward and sixty-nine reverse speeds are obtainable. Fig. 8 is a diagram to illustrate the system of enumerating the different speeds that are obtained by the device illustrated in Figs. 6 and 7. Fig. 9 is a side elevation of a drill press with a device similar to that shown in Fig. 7 applied thereto. Fig. 10 is a perspective view of a screw-cutting lathe, with the device illustrated in Fig. 8 used to obtain the speed variations and reversal on the main spindle, and a device like that shown in Fig. 6 to drive the lead screw and the plain-turning feed at various speeds relative to those of the spindle. Fig. 11 illustrates a device combining the use of the idler and of the internal gear, affording six forward and four reverse speeds, the diagram only being shown, it being understood that the details may be similar to those illustrated in Figs. 1 and 4.

The underlying principle of my invention involves the combination of a driving or power shaft and a driven or work shaft with one or more lay or intermediate shafts, and means for effecting variation of speed in the motion transmitted, successively, from the power shaft to a lay shaft, and from the lay shaft to the work shaft, whereby the ratios of speed variation may be compounded, and whereby the number of variations may equal the product of the successive numbers of speed variations. This principle is herein illustrated by a number of specific examples, a description of which will elucidate the above statement.

In the example illustrated in Fig. 1, the power shaft 1 and the work shaft 2 are alined, and their ends are adjacent. They have bearings 1' and 2', respectively. The lay shaft 3 is parallel to the shafts 1 and 2, with bearings 3'. Gears $1^a$ and $1^b$, rigidly secured together, are slidable on the power shaft 1, but turn therewith, being splined thereon, as shown. Gears $3^a$ and $3^b$, rigidly secured together, are keyed on the lay shaft 3, so that the gears $1^a$ and $1^b$ may mesh with them, respectively. This affords two different ratios between the power and lay shafts.

The work shaft 2 has three gears $2^d$, $2^e$ and $2^f$, keyed on it, and the lay shaft 3 has three gears $3^d$, $3^e$ and $3^f$, rigidly secured together and splined on it, to slide thereon and mesh with said gears $2^d$, $2^e$ and $2^f$, respectively. This affords three different ratios between the lay and work shafts.

It will be seen that either ratio between the power and lay shaft may be compounded with any one of three ratios between the lay and work shafts, so that the resultant number of ratios afforded, from power to work shaft, is six.

An idler gear $1^c$ turns loosely on a stationary shaft $1^{c'}$, and may be slid thereon by a fork $1^g$. The fork $1^e$ has an arm with a stud $1^{e'}$ received by a slotted head $1^h$, and this head $1^h$ has an arm $1^{h'}$ that embraces the hub of the gears $1^a$ and $1^b$. When this head and its arm are moved by a crank $1^k$, the gears $1^a$ and $1^b$ move with it, with no lost motion, to mesh the gears with the gears $3^a$ and $3^b$, respectively. The slot of the head $1^h$ is so proportioned and positioned that the fork $1^g$ will move with the head immediately, when the gears $1^a$ and $3^a$ are being unmeshed, sliding to the right, as seen in Fig. 1, until the gear $1^b$ meshes with the gear $3^b$. But when the gears are slid to the left, the head $1^h$ will have the gears $1^a$ and $3^a$ unmeshed before it begins to slide the fork $1^g$, so that the gear $1^b$ will mesh with the idler $1^c$, and then, sliding to the left continuing, the idler $1^c$ will be meshed with the gear $3^a$. A spring $1^{g''}$ surrounds the shaft $1^{c'}$ and is compressed between one of the two supports $1^{c''}$ of the shaft and the fork $1^g$, to render the movement of the fork certain.

By the means just described, it will be seen that the motion of the lay shaft, and, consequently, that of the work shaft, is reversed without reversing the motion of the power shaft, by introducing the idler $1^c$ between the gears $1^b$ and $3^a$. Incidentally, a new ratio is established between the power and lay shafts, by connecting the gear $1^b$ to the gear $3^a$ instead of to the gear $3^b$, as was done before. It will be seen that the reverse motion will be susceptible to three ratios, from lay shaft to work shaft, through the gears $3^d$, $3^e$ or $3^f$ and the gears $2^d$, $2^e$ and $2^f$, respectively. Thus, the example of Fig. 1 would afford a total of six forward and three reverse speeds by manipulation of the gears above described. The gears $3^d$, $3^e$ and $3^f$ are moved by a fork $3^g$ on a sliding head $3^h$, having a stud $3^{h'}$ extending through a slot in the support of the head, to which stud a rod $3^k$ is pivoted.

To afford direct connection between the power and the work shaft, and thus eliminate all the gears from the operation, a suitable clutch $1^m$ is provided. With this clutch affording a direct transmission from power to work shaft, the total number of forward speeds is increased to seven, the total number of various conditions of transmission is ten, and, designating these conditions by S and the gears by G, the relative simplicity of the device may be expressed as follows: 10 S : 11 G.

In the modification illustrated in Figs. 1 and 2, above described, the gears secured together are so spaced that the different combinations may be made while the parts are in motion, in the well known manner. In Fig. 3, a simpler arrangement of the device is shown, each slidable gear being individually slidable; this, as is well known, requires less length of the device, but multiplies the number of means for manipulation. The power shaft 11 and work shaft 12 are alined with the lay shaft 13 parallel to them, and the shafts 11 and 12 have, respectively, the gears $11^a$, $11^b$, $11^c$, $11^d$, and $11^e$, and the gears $12^f$, $12^g$, $12^h$, $12^j$ and $12^k$. The former are slidable, and each is provided with a fork $11'$. The lay shaft has gears $13^a$, $13^b$, $13^c$, $13^d$ and $13^e$, to mesh with the power shaft gears as above mentioned, respectively, and has gears $13^f$, $13^g$, $13^h$, $13^j$ and $13^k$, to mesh with the work shaft gears, as mentioned, respectively. Each of these latter gears on the lay shaft is slidable and has a fork $13'$. In this case, the idler $12'$, is located on the work end of the device, to make connection between the gears $12^j$ and $13^h$, for reversing the motion. A clutch $11^m$ may connect the shafts 11 and 12 directly together. By this device, with five pairs of gears at each end, twenty-five different combinations are available with the use of the above gears. Using the clutch provides one more speed, making twenty-six forward speeds; and the use of the idler renders the five different combinations at the power end of the device into five reverse speeds at the work end. Thus, the total number of different conditions of transmission is thirty-one, and, according to the previous designations, the relative simplicity is: 31 S : 22 G.

In Fig. 4, the arrangement is similar to that shown in Figs. 1 and 2, but an internal gear, at the work end of the device, is substituted for the idler. The power shaft 21 has the gears $21^a$ and $21^b$, rigidly secured together and splined on the shaft, and the work shaft 22 has the gears $22^d$, $22^e$ and $22^f$ keyed on it. The lay shaft 23 has gears $23^a$ and $23^b$ keyed on it and separated, so that the gears $21^a$ and $21^b$ may be interchanged, and it also has the gears $23^d$, $23^e$ and $23^f$ slidable on it, all rigidly attached together, to interchange with the gears on the work shaft, as mentioned, respectively. A fork $21^g$ slides the gears $21^a$ and $21^b$, and a fork $23^g$ on a sliding head $23^h$, with stud $23^{h'}$ pivoting a rod $23^k$, moves the gears $23^d$, $23^e$ and $23^f$. A clutch $21^l$ may connect the shafts 21 and 22 directly.

The internal gear $22^p$ has a long hub and is splined on the work shaft 22, while the lay shaft 23 has a pinion $23^p$ on its end, being as here shown, integral with the shaft. The internal gear meshes with this pinion, when slid in by a fork $22^q$.

To prevent meshing of the internal gear while any one of the gears 23ᵈ, 23ᵉ or 23ᶠ is in mesh, a locking device is provided. The sliding head 23ʰ has an arm 23ᵏ with a part parallel to the direction of the sliding of the head, and this part has three notches 23ᵏ' opening toward the work shaft. A dog 22ᵏ is pivoted to enter either adjacent two of these notches, being located, and the notches being positioned in the arm relative to the location of said dog, in such a manner that the dog cannot enter the slots unless the three gears above mentioned are in such position that none of them is in mesh with its corresponding gear on the work shaft. The fork 22ᵃ has a pin 22ᵠ', and a cam 23ʳ is mounted to turn with the dog 22ᵏ on its pivot. The shape of the cam is such that when the dog enters either adjacent two of the notches, the fork can move the internal gear 22ᵖ, but when the dog is out of the notches, it is locked against the face of the arm and cannot turn, at the same time holding the cam in such position that the fork cannot be moved, and thus holding the internal gear out of mesh. In this example, the combinations permissible between the two pairs of gears, at one end, and the three pairs at the other, number six, while the clutch furnishes a seventh, and the internal gear reverses the two different speeds obtainable from the two pairs of gears at the power end, making a total of nine, so that the relative simplicity may be expressed 9 S : 12 G. It will be seen that the simplicity is not as marked as in the previous examples. However, the large internal gear is useful in providing a considerable reduction in speed on the reverse motion, by its coöperation with the small pinion, as is useful in some applications, as in an automobile truck.

In Fig. 5, the power shaft 31 and work shaft 32 are combined with two parallel and flanking lay shafts 33 and 34, one closer to the shafts 31 and 32 than is the other. Gears 31ᵃ, 31ᵇ and 31ᶜ are keyed on the power shaft, and gears 32ᵈ, 32ᵉ and 32ᶠ are keyed on the work shaft. All the gears on the lay shafts, to mesh with the above mentioned gears, are individually slidable, and, meshing with the above gears, in the order named, are as follows: On the shaft 33, the gears 33ᵃ, 33ᵇ and 33ᶜ, and the gears 33ᵈ, 33ᵉ and 33ᶠ; and on the shaft 34, the gears 34ᵃ, 34ᵇ and 34ᶜ, and the gears 34ᵈ, 34ᵉ and 34ᶠ. An additional gear 32ᵍ is provided on the work shaft, and is splined thereon, as is also an additional gear 33ᵍ, to mesh with the gear 32ᵍ, splined on the shaft 33. A gear 34ᵍ, on the shaft 34, may also have the gear 32ᵍ meshed with it, and, as shown, is integral with the shaft 34. A second additional gear 33ʰ is splined on the shaft 33, and an idler 33ⁱ slides on a shaft 33ⁱ', to mesh with and connect together the gear 33ʰ and the aforesaid gear 32ᵍ on the work shaft. All the slidable gears have forks 35. A clutch 31ᵐ may connect the shafts 31 and 32 directly, being operated by the fork 31ᵐ'.

By combining the three sets of gears at the power end variously with the four sets at the work end, herein, twenty-four various speeds may be obtained, which, with the direct speed from use of the clutch, amounts to twenty-five speeds; the idler renders the three speeds of the shaft 33 into reverse speeds on the work shaft, so that the total number of different conditions of transmission is twenty-eight, and the relative simplicity may be expressed: 28 S : 23 G.

In all of the above examples, the number of speeds obtainable closely approached or exceeded the number of gears employed, being of advantage over devices employing approximately two gears for each change of speed obtained.

In the following examples, the relative simplicity is still more marked. For convenience, I shall make use of certain terms which I will here explain, as they are meant in connection with the subject. The different shafts are made the basis of classification, and the gears themselves are treated merely as the means that operatively connect the shafts, in whatever series the shafts are to be combined. The relative sizes of the gears thus forming these connections of course determine the ultimate speed derived, and it will be understood that these may be varied according to the results to be obtained, and assorted in any one device in such a manner that, in connection with the different combinations, not only of gears, but of shafts, a gradation of speeds, from the lowest to the highest, is provided, without duplicating any of the speeds. These considerations, as well as the minor details of any application of my invention, being those of engineering and mechanical skill, need no extended treatise herein. Making the shafts, then, the basis of classification, I shall designate a combination as primary if it consists of only one shaft, or, as is really the case herein, two shafts turning directly together, at the same speed, as connected by the clutch, in each of the previous, as well as the following examples. In the same manner, a combination of two shafts, as of the power shaft and a lay shaft, without the work shaft, in any of the previous or following examples, would be designated as binary; however, such a combination, simply, does not occur in a device involving the principles of my invention. The combination of the power shaft, the lay shaft, and the work shaft, as in all of the previous examples, I shall designate as ternary. A quarternary combination, having four shafts in series, and a quinary combination, having five shafts in series, will be referred to; also, as in Fig. 11, and as touched on in Fig. 8, with idler and internal gear combined, partaking of the nature of the examples of Figs. 4, 6 and 7 as well as of those of Figs. 1, 2, 3 and 5, a combination of six shafts in series will be presented, which, for lack of an accepted term, will be referred to as super-quinary. In Fig. 6, then, there is a power shaft 41 and a work shaft 42, in alinement, but not with their ends adjacent, and there are two lay shafts 43 and 44, flanking the shafts 41 and 42, and parallel with them, one being closer to the alined shafts than is the other, as in Fig. 5. Between the separated ends of the alined shafts 41 and 42, in alinement with them, is a fifth shaft 45, which, as will be seen, is of various utility, and which I shall call a sub-shaft, for sake of brevity. All the shafts have suitable bearings, as illustrated.

The power shaft has the gears $41^a$, $41^b$ and $41^c$ keyed on it, the work shaft 42 has the internal gear $42^g$ splined on it and moved by a fork $42'$, while the lay shafts have gears $43^a$, $43^b$ and $43^c$, and gears $44^a$, $44^b$ and $44^c$, respectively, to mesh with the gears on the power shaft. These shafts also have the gears $43^d$, $43^e$ and $43^f$, and the gears $44^d$, $44^e$ and $44^f$, to mesh with gears $45^d$, $45^e$ and $45^f$, keyed on the sub-shaft 45, respectively. All the above mentioned gears on the lay shafts 43 and 44 are individually slidable, and each has a fork $43'$ or $44'$, as the case may be. The internal gear $42^g$ has spur-gear teeth on its periphery, as well as its internal teeth, this part of the gear being designated as the gear $42^h$. The shaft 43 has the gear or pinion $43^g$ integral with it, and meshing with the internal part of the gear, $42^g$, while the shaft 44 has a gear or pinion $44^h$ that meshes with the external part of the gear, $42^h$. This pinion $44^h$ is splined on the shaft 44, and moved by a fork $44^{h'}$. A clutch $41^m$ will connect the power shaft to the sub-shaft, and a clutch $45^n$ will connect the sub-shaft to the work shaft; these clutches have forks $41'$ and $45'$, respectively.

The device illustrated in vertical cross section in Fig. 7 represents the arrangement above described, with the addition of the third lay shaft 46, having gears $46^a$, $46^b$ and $46^c$ splined on it, to mesh with the gears $41^a$, $41^b$ and $41^c$ on the power shaft, and having gears $46^d$, $46^e$ and $46^f$ splined on it, to mesh with the gears $45^d$, $45^e$ and $45^f$, on the sub-shaft, respectively. This shaft 46 also has a gear or pinion $46^h$, splined on it, to mesh with the external part of the gear, $42^h$. Each of the gears $46^a$, $46^b$, $46^c$, $46^d$, $46^e$, $46^f$ and $46^h$, has a fork $46'$, as indicated.

The diagram in Fig. 8 will enable the subsequent explanation of the different combinations available with the devices of Figs. 6 and 7, intelligible. Referring to Fig. 6, and with reference to this diagram, the reference letters $a$, $b$, $c$, $d$, $e$, $f$, $m$ and $n$, $l$ and $p$, and $r$, $s$, $t$, $u$, $v$ and $w$ only are observed, the remaining letters $g$, $h$, $i$, $k$, $q$, $x$, $y$ and $z$ having reference to the example of Fig. 7, to be considered later. Making use of the terms before explained, then, there will be a primary combination when the two clutches are engaged, and this speed on the work shaft, which will be the same speed, in the same direction as that of the power shaft, will be designated, according to the diagram of Fig. 8: $mn$. Then there will be a ternary, which will be called the first ternary combination, when the clutch at $m$ is engaged and the clutch at $n$ is open, and with either of the pinions at the ends of the lay shafts meshed, at $l$ or $p$ in the diagram. The three shafts entering into the combination will be the sub-shaft, along with the power shaft with which it turns, either one of the lay shafts, and the work shaft. Any one of the six gears on the two lay shafts meshing with the three gears, respectively, on the sub-shaft, may be used, so that six speeds are afforded for the work shaft, designated, from the diagram, the latter three being of reverse motion: $rl$, $sl$, $tl$, $up$, $vp$ and $wp$. The second ternary combination will be had with the clutch at $m$ open and the clutch at $n$ closed, rendering the sub-shaft unitary with the work shaft. Three different connections between the power shaft and either lay shaft, and four between either lay shaft and the unitary sub-shaft and work shaft are available, making possible twenty-four speeds of the work shaft, the last three being of reverse motion, designated: $arn$, $brn$, $crn$, $asn$, $bsn$, $csn$, $atn$, $btn$, $ctn$; $dun$, $eun$, $fun$, $dvn$, $evn$, $fvn$, $dwn$, $ewn$, $fwn$; $al$, $bl$, $cl$ and $dp$, $ep$, $fp$.

Releasing both clutches, a quinary combination is made possible, the sub-shaft, released from both the power and the work shaft, having the function of a lay shaft carrying idlers that form connection from one lay shaft proper over to the opposite one. The pinions at the ends of the lay shafts are made to coöperate with the gears at the respective opposite sides of the device at the opposite or power end thereof, determining which lay shaft shall precede in the series. Thus, each lay shaft may derive three speeds from the power shaft, and the sub-shaft may derive three speeds from any one speed of either lay shaft: since the gears on this sub-shaft are secured together, it will be seen that the sub-shaft may transmit any speed it derives from one lay shaft to the opposite lay shaft rendered into three different speeds, to be from there transmitted to the work shaft through the external or the internal part of the gear thereon, as the case may be, and thereby determining the direction of motion. Thus, twenty-seven forward and twenty-seven reverse speeds are imparted to the work shaft, designated, respectively: *durl, dusl, dutl, dvrl, dvsl, dvtl, dwrl, dwsl, dwtl; eurl, evsl, eutl, evrl, evsl, evtl, ewrl, ewsl, ewtl; furl, fusl, futl, fvrl, fvsl, fvtl, fwrl, fwsl, fwtl;* and *arup, arvp, arwp, brup, brvp, brwp, crup, crvp, crwp; asup, asvp, aswp, bsup, bsvp, bswp, csup, csvp, cswp; atup, atvp, atwp, btup, btvp, btwp, ctup, ctvp, ctwp.*

Summing up the above different series of speeds, as derived from the different combinations, one in the primary combination, six in the first ternary combination, of which three are reverse, twenty-four in the second ternary combination, of which three are reverse, and fifty-four in the quinary combination, of which twenty-seven are reverse, there is a total of fifty-two forward and thirty-three reverse speeds, or a total of eighty-five different conditions of transmission. Treating the gear on the work shaft, internal and external, as two gears, there is a total of twenty-two gears used, and the relative simplicity of the device illustrated in Fig. 6 is: 85 S : 22 G.

With the introduction of an idler, either on one side at the power end, as signified in Fig. 11, or on both sides at this end, or on one or both sides at the work end, between sub-shaft and lay shaft, a combination is effected that may be styled super-quinary, as before alluded to, whereupon the idler and the internal gear neutralize each other, and the reverse speeds are obtained from the side of the work end opposite from that in the example just explained. Designating this idler by $k$, in Fig. 8, the super-quinary combinations will afford speeds designated: *bkrup, bkrvp, bkrwp; bksup, bksvp, bkswp; bktup, bktvp, bktwp;* all of which are forward speeds. Since the idler causes the gear on the power shaft to mesh with a different gear on the lay shaft than the one it meshed with before, a new series of speeds are derived by meshing the pinion at $l$, or by closing the clutch at $n$ and meshing any of the gears on the sub-shaft with the respective gear on the lay shaft. These speeds will all be of reverse motion, as derived through the simple use of the idler, and are designated, respectively: *bkl* and *bkrn, bksn, bktn.* This will be, in effect, a quaternary series, or, for sake of uniformity, may be termed a super-ternary series. Both series add nine forward and four reverse speeds to those attainable by the other combinations just explained, or a total of thirteen different conditions of transmission, making the relative simplicity of the entire device, with both idler and internal gear: 98 S : 23 G.

Further referring to the diagram in Fig. 8, with reference to the example of Fig. 7, the third lay shaft will add three speeds in the first ternary series, twelve in the second ternary series, and in the quinary series the number of speeds will be tripled. Thus, in the first ternary series, the new speeds are designated, from the letters reserved in Fig. 8: *xq, yq* and *zq,* all being of forward motion. In the second ternary, those added are designated, all being of forward motion: *gxn, hxn, ixn, gyn, hyn, iyn, gzn, hzn, izn,* and *gq, hq, iq.*

In the quinary series of combinations, the new speeds are derived, not only by the co-operation of the added lay shaft with either one of the first two lay shafts, but of them with it, so that the new speeds are designated: *arxq, aryq, arzq; asxq, asyq, aszq; atxq, atyq, atzq; brxq, bryq, brzq; bsxq, bsyq, bszq; btxq, btyq, btzq; crxq, cryq, crzq; csxq, csyq, cszq; ctxq, ctyq, ctzq; duxq, duyq, duzq; dvxq, dvyq, dvzq; dwxq, dwyq, dwzq; euxq, euyq, euzq; evxq, evyq, evzq; ewxq, ewyq, ewzq; fuxq, fuyq, fuzq; fvxq, fvyq, fvzq; fwxq, fwyq, fwzq;* and *gxrl, gxsl, gxtl; gyrl, gysl, gytl; gzrl, gzsl, gztl; hxrl, hxsl, hxtl; hyrl, hysl, hytl; hzrl, hzsl, hztl; ixrl, ixsl, ixtl; iyrl, iysl, iytl; izrl, izsl, iztl; gxup, gxvp, gxwp; gyup, gyvp, gywp; gzup, gzvp, gzwp; hxup, hxvp, hxwp; hyup, hyvp, hywp; hzup, hzvp, hzwp; ixup, ixvp, ixwp; iyup, iyvp, iywp; izup, izvp, izwp;* the last twenty-seven of which are of reverse motion. Summing up these added speeds, and aggregating them with the eighty-five speeds accredited to the device of Fig. 6 without the idler, there is a total of ninety-six forward and twenty-seven reverse speeds added, so that the device of Fig. 7 affords a total of one-hundred and forty-eight forward and sixty reverse speeds, or two hundred and eight different conditions of transmission, and its relative simplicity is expressed: 208 S : 29 G.

In Fig. 11, an example illustrating the combination of the idler and the internal gear in a single device, before alluded to, and considered in connection with the above devices, the power shaft 51 has slidable gears $51^a$ and $51^b$, while the work shaft 52 has gears $52^c$ and $52^d$. The single lay shaft 53 has gears $53^a$ and $53^b$ to mesh with the gears $51^a$ and $51^b$, respectively, and gears $53^c$ and $53^d$ to mesh with the gears $52^c$ and $52^d$, respectively. The power and work shafts may be directly connected by a clutch 51', and an internal gear $52^e$ may mesh with a pinion $53^e$, they being on the work and lay shaft, respectively. An idler $51^c$ may connect the gear $51^a$ to the gear $53^b$, on the power and lay shaft respectively. The diagrammatic illustration may refer, for detail, to the examples of Figs. 1 and 2, showing the idler, and Fig. 4, showing the internal gear arrangement.

Compared with the examples of Figs. 6 and 7, the present device may be said to afford a series of ternary combinations with the idler inoperative, and a series of quaternary combinations with the idler employed. Thus, observing the reference letters of Fig. 11, the speeds of the ternary series are: $ax$, $ay$, $bx$, $by$ and $aq$, $bq$, the last two being of reverse motion. Those of the quaternary series are: $bkx$, $bky$ and $bkq$, the first two being of reverse motion, derived through the idler. Also, of course, the primary or direct speed of the power shaft is transmitted to the work shaft by engaging the clutch at $m_r$. Summing up these speeds, there is a total of six forward and four reverse speeds, or a total of ten different conditions, and the relative simplicity of the device is: 10 S : 11 G, which, though not so marked, closely approaches an average of a speed to each gear, and at the same time employs few enough gears to render it suitable for certain uses not involving a large number of speed changes and requiring fewness of parts, as in an automobile transmission mechanism.

Fig. 9 illustrates a drill press provided with a device similar to that illustrated in Fig. 7, the reference characters serving to indicate the relative arrangement of the device on the drill, which, being of well known design, need not be particularly described.

In Fig. 10 the application of the example of Fig. 7 is made to the spindle of the lathe, while a device similar to that of Fig. 6 is introduced into the means for driving the lead screw and the apron-feed, used for plain turning. The spindle of the lathe has the gear 67, and the gear 68, meshing therewith, is on the work shaft of the variable speed mechanism, the power shaft 41 having the pulley 69, by which the entire machine is driven. The lathe spindle has another gear 77, meshing with a gear 78 on the power shaft of the other variable speed mechanism, on the work shaft of which is a gear 79. The details of these mechanisms may be identified through the reference characters, referring to Figs. 7 and 6, respectively. A gear 87 is on the lead screw used in screw-cutting, and a yoke 88 carries unitary concentric idlers 88' and 88''. The idler 88' constantly meshes with the gear 79, and may mesh with the gear 87 when the yoke is raised: when the yoke is lowered, the idler 88'' may mesh with another idler 89, driving the feed-rod through its gear 97, for plain turning. The lathe, of well known design, need not be further described.

Consideration of the various examples will make it understood that the ability to compound the ratios results in a much more rapid increase in possible speed variations than of gears, i. e., S increases more rapidly than G does, as the number of gears, G, is increased. For instance, the great difference between the examples of Figs. 6 and 7; and, furthermore, where the number of shafts remain the same, but merely more gears are provided at either or both ends of the device. Thus, in the example of Fig. 6, the addition of three gears at each end, making six gears added, results in a relative simplicity of: 177 S : 28 G. A further similar addition results in: 321 S : 34 G; and, again: 529 S : 40 G. Further moderate increase of G results in enormous increase of S, to far higher degree than could be utilized. However, such examples indicate the distinctiveness of character of my novel principle of combining gears to attain high numbers of speed variations in a practical manner. Therefore, I do not wish to be understood as limiting myself to the details of the examples given, but

What I claim as new and desire to secure by Letters Patent is:

1. Variable speed mechanism comprising a plurality of members coöperative in series, means for changing the operative connection of each member with each member adjacent to it in the series, and means for combining some of the changeable operative connections whereby the individual operative effect of each connection thus combined is eliminated.

2. Variable speed mechanism comprising a plurality of shafts coöperative in series, three of said shafts being in alinement, a series of interchangeable gears operatively connecting each of said shafts with each shaft adjacent to it in the series, and means for changing the order of one of the alined shafts in the series.

3. Variable speed mechanism comprising a plurality of shafts coöperative in series, a series of interchangeable gears operatively connecting each of said shafts with each shaft adjacent to it in the series, an idler gear adapted to be introduced into one of said series of gears by such interchange thereof, and an internal gear interchangeably introduced into another of said series of gears, whereby the individual reversing effects of said idler gear and said internal gear are eliminated.

4. Variable speed mechanism comprising a plurality of shafts coöperative in series, a series of interchangeable gears operatively connecting each of the shafts with each shaft adjacent to it in the series, an internal gear adapted to be meshed with or unmeshed from one of the gears of one of said shafts, and means for compelling alternative utilization of said internal gear with the other gears of said series.

5. Variable speed mechanism comprising a plurality of shafts coöperative in series, a series of engageable and disengageable gears operatively connecting each of the shafts with each shaft adjacent to it in the series, some of the gears of one of said series of gears being unitary, a gear of said series independently engageable and disengageable with respect to said unitary gears, a notched member movable through engagement or disengagement of said unitary gears, and a cam having parts to enter notches in said member when said gears are disengaged, said cam allowing engagement of said independently engageable and disengageable gear when its parts enter the notches, but preventing such engagement when said parts are out of said notches.

6. Variable speed mechanism comprising a plurality of shafts coöperative in series, a series of gears alternatively operatively connecting each of said shafts with each shaft adjacent to it in the series, and clutches for rendering one of the shafts unitary with others of said shafts alternatively with the operative connection of said gears.

7. Variable speed mechanism comprising a plurality of shafts coöperative in series, some of said shafts being in alinement, a series of gears alternatively operatively connecting each of said shafts with each shaft adjacent to it in the series, and clutches for rendering the alined shafts unitary, alternatively with the operative connection of said gears.

8. Variable speed mechanism comprising a quinary combination of shafts coöperative in series, three of said shafts being in alinement, and means for alternatively effecting primary or ternary combination of some of said shafts.

9. Variable speed mechanism comprising three alined shafts and parallel flanking lay shafts, and means forming changeable operative connection between either of the lay shafts and each of the alined shafts.

10. Variable speed mechanism comprising three alined shafts and parallel flanking lay shafts, and means for alternatively effecting primary, ternary or quinary combination between some of said shafts.

11. Variable speed mechanism comprising three shafts in alinement and three other shafts parallel to the alined shafts, and means for operatively connecting the alined shafts through any one of the other three shafts.

12. Variable speed mechanism comprising three shafts in alinement and three other shafts parallel to the alined shafts, means for operatively connecting the alined shafts by operative connection from each of them to any one of the other three shafts, and means for changing the operative conection between some of the shafts thus connected.

13. Variable speed mechanism comprising three shafts in alinement and three other shafts parallel to the alined shafts, means for operatively connecting the alined shafts through any one of the other three shafts, and means for rendering all or either two of the alined shafts unitary.

14. Variable speed mechanism comprising three shafts in alinement and other shafts parallel to the alined shafts, means for operatively connecting the alined shafts through any one of the other shafts, and means for rendering all or either two of the alined shafts unitary.

15. Variable speed mechanism comprising a plurality of shafts in alinement and a plurality of shafts parallel to the alined shafts, means for operatively connecting the alined shafts through any of the parallel shafts, means for changing the operative connections whereby different compounds of their effects are obtained, and means for rendering different combinations of the alined shafts unitary.

16. Variable speed mechanism comprising a plurality of shafts in alinement and a plurality of shafts parallel to the alined shafts, means for operatively connecting the alined shafts through any of the parallel shafts, means for connecting some of the alined shafts through another one of said alined shafts in series with some of said parallel shafts, and means for changing the operative connections between the shafts.

17. Variable speed mechanism comprising a plurality of shafts in alinement and a plurality of shafts parallel to the alined shafts, means for operatively connecting the alined shafts through any of the parallel shafts in series, means for connecting some of the alined shafts through another one of said alined shafts in series with some of said parallel shafts, and means for changing the operative connection between each two adjacent shafts in a series.

18. Variable speed mechanism comprising a plurality of shafts in alinement and a plurality of shafts parallel to the alined shafts, means for operatively connecting the alined shafts through any of the parallel shafts in series, means for connecting some of the alined shafts through another one of the alined shafts in series with some of the parallel shafts, means for changing the operative connection between each two adjacent shafts in a series, and means for rendering some of the alined shafts unitary.

19. Variable speed mechanism comprising a plurality of shafts in alinement and a plurality of shafts parallel to the alined shafts, interchangeable gears connecting some of said parallel shafts to some of said alined shafts, and means for rendering one of the alined shafts intermediate of the parallel shafts in a series connecting the other alined shafts through the interchangeable gears.

20. Variable speed mechanism comprising a plurality of shafts in alinement and a plurality of shafts parallel to the alined shafts, interchangeable gears connecting some of said parallel shafts to some of said alined shafts, means for rendering one of the alined shafts intermediate of the parallel shafts in series connecting the other alined shafts through the interchangeable gears, and clutches for rendering said one of the alined shafts unitary with one or another or both of the alined shafts connected by it as aforesaid.

21. Variable speed mechanism comprising a plurality of shafts in alinement and a plurality of shafts parallel to the alined shafts, changeable operative connection between some of the parallel shafts and some of the alined shafts, and means for connecting or disconnecting each two adjacent alined shafts.

22. Variable speed mechanism comprising a plurality of shafts in alinement and a plurality of shafts parallel to the alined shafts, changeable operative connection between each parallel shaft and each alined shaft, connection between alined shafts to eliminate the operation of the operative connection of said alined shafts with said parallel shafts and separate individual exterior bearings for the respective alined shafts, flanking their connection.

23. Variable speed mechanism comprising a plurality of alined shafts and a plurality of shafts parallel to the alined shafts, means for causing one of the alined shafts to operatively connect two other of said alined shafts, and means coöperating with said one of the alined shafts and said parallel shafts, whereby power may be transmitted from either of said other alined shafts through either of the parallel shafts, said one of the alined shafts and the other parallel shafts to the remaining alined shaft.

24. Variable speed mechanism comprising a plurality of alined shafts and a plurality of shafts parallel to the alined shafts, means for operatively connecting each shaft to any other shaft, and means for changing each operative connection.

25. Variable speed mechanism comprising a plurality of alined shafts, one of which is the work shaft and another of which is the power shaft, and a plurality of shafts parallel to the alined shafts, and means for effecting primary, ternary and quinary combinations of said shafts, to operate in series.

26. Variable speed mechanism comprising a plurality of alined shafts and a plurality of shafts parallel to the alined shafts, means for effecting primary, ternary and quinary combinations of said shafts, to operate in series, and means for reversing operation through the ternary and quinary combinations.

27. Variable speed mechanism comprising a plurality of alined shafts and a plurality of shafts parallel to the alined shafts, means for effecting primary, ternary and quinary combinations of said shafts, to operate in series, and means for effecting a quaternary combination of the shafts to operate reversely in series.

28. Variable speed mechanism comprising a plurality of alined shafts and a plurality of shafts parallel to the alined shafts, interchangeable gears adapted for effecting ternary and quinary combinations of said shafts, and clutches adapted for effecting a primary combination of said alined shafts.

29. Variable speed mechanism comprising a plurality of alined shafts and a plurality of shafts parallel to the alined shafts, interchangeable external gears adapted for effecting ternary and quinary combinations of said shafts, clutches adapted for effecting a primary combination of the alined shafts, and an internal gear on one of the alined shafts and a gear on one of the parallel shafts meshing with said internal gear, for reversing operation through the ternary and quinary combinations.

30. Variable speed mechanism comprising a plurality of alined shafts, interchangeable external gears adapted for effecting ternary and quinary combinations of said shafts, an idler gear to be interposed between an alined shaft and a parallel shaft, to reverse operation through said combinations, an internal gear on one of said alined shafts and a gear on one of said parallel shafts meshing with said internal gear, for reversing operation through said combinations, and means whereby said idler gear and said internal gear are introduced simultaneously, and whereby they neutralize the reversing effect, each of the other, in said combinations.

31. Variable speed mechanism comprising a power shaft, a sub-shaft, and a work shaft in alinement in the order mentioned, a plurality of lay shafts parallel to the alined shafts, interchangeable gears operatively connecting each lay shaft to the power shaft, interchangeable gears operatively connecting each lay shaft to the sub-shaft, operative connection between the lay shafts and the work shaft, a clutch connecting the power shaft to the sub-shaft, a clutch connecting the sub-shaft to the work shaft, whereby primary combination of the alined shafts through said clutches to the exclusion of the interchangeable gears or of the operative connection between the lay shafts and the work shaft, or of both, may be effected and whereby ternary and quinary combinations of said shafts through said interchangeable gears, to the exclusion of either one or both of said clutches, may be effected.

32. Variable speed mechanism comprising a power shaft, a sub-shaft, and a work shaft in alinement in the order mentioned, a plurality of lay shafts parallel to the alined shafts, interchangeable gears operatively connecting each lay shaft to the power shaft, interchangeable gears operatively connecting each lay shaft to the sub-shaft, an internal gear on the work shaft and a gear on one of the lay shafts meshing with said internal gear, an external gear on said work shaft and a gear on another of the lay shafts to mesh with said external gear.

33. Variable speed mechanism comprising a power shaft, a sub-shaft, and a work shaft in alinement in the order mentioned, a plurality of lay shafts parallel to the alined shafts, interchangeable gears operatively connecting each lay shaft to the power shaft, interchangeable gears operatively connecting each lay shaft to the sub-shaft, an internal gear on the work shaft and a gear on one of the lay shafts meshing with said internal gear, an external gear on said work shaft and a gear on another of the lay shafts to mesh with said external gear, and an idler introduced between one of said alined shafts and the lay shaft that has the gear meshing with the internal gear.

34. Variable speed mechanism comprising a plurality of alined shafts and a plurality of shafts parallel to the alined shafts, unitary gears on an intermediate one of the alined shafts, gears on each parallel shaft respectively engageable with the unitary gears, and respectively engageable gears operatively connecting each lay shaft to others of said alined shafts, whereby quinary combinations of said parallel and alined shafts may be effected through the unitary gears on the intermediate one of said alined shafts.

35. Variable speed mechanism comprising three alined shafts, clutches connecting either two adjacent ones of said shafts to rotate together, whereby simultaneous operation of said clutches may connect all of said shafts to rotate together, or dissimultaneous operation may connect either two adjacent ones of said shafts to rotate together, and separate individual exterior bearings for the respective shafts, flanking the respective clutches.

36. Variable speed mechanism comprising alined shafts, a shaft parallel to the alined shaft, changeable operative connection between each alined shaft and the parallel shaft, a clutch to render two alined shafts unitary, and separate individual exterior bearings for the respective alined shafts, flanking said clutch.

37. Variable speed mechanism comprising parallel shafts, gears on the respective shafts meshing together, other gears on the respective shafts meshing together, of different ratio from the aforementioned gears, and an idler interposed between the lesser of the two gears on the respective shafts, some of said gears being movable to allow the introduction of said idler.

38. Variable speed mechanism comprising a pair of unitary gears, one less than the other, a lesser gear to mesh with the greater of the pair and a greater gear to mesh with the lesser of the pair, said meshing gears last mentioned being stationary against lateral movement and the unitary gears being laterally slidable to mesh or unmesh with the last mentioned gears, an idler gear laterally slidable to mesh with both the lesser gears, a fork to slide the unitary gears, a fork to slide the idler gear, connection between the forks allowing loss of motion between them such that the lesser of the unitary gears will remain unmeshed from said idler gear until it has become unmeshed from the greater gear with which it meshes, and until the greater of said unitary gears has become unmeshed from the lesser gear with which it meshes, and such that said idler gear will then remain stationary until the lesser of said unitary gears has meshed with it, but such that said idler gear will then be moved with said unitary gears, remaining in mesh with said lesser gear, until it has meshed with the other lesser gear, substantially as set forth.

39. Variable speed mechanism comprising a power shaft, a series of gears thereon of different diameter, lay shafts, a series of gears on each lay shaft, complementary to and meshing with respective gears on the power shaft, a sub-shaft in alinement with the power shaft, a series of gears thereon, another series of gears on each lay shaft, complementary to and meshing with respective gears on the sub-shaft, a work shaft, gears thereon, a gear on each lay shaft to mesh with the gear on the work shaft, each of the gears in each of said series, and of the gears on the work shaft, and of the gears on the lay shafts meshing therewith, being of different diameter, and each lay shaft being at a different distance from said alined power and sub-shafts, and means for meshing and unmeshing said gears for effecting ternary and quinary combinations of said shafts in series, the gears on said sub-shaft being unitary, whereby the motion of said sub-shaft, as derived in a quinary combination, may be manifested through any of said gears thereon, for the purposes set forth.

40. The combination with a main spindle and a lead screw of a lathe, of a gear on the main spindle, a variable speed mechanism having a power shaft and a work shaft, a gear on the work shaft meshing with the gear on the main spindle, means for driving the power shaft of said mechanism, to drive the lathe, another gear on the main spindle, another variable speed mechanism having a power shaft and a work shaft, a gear on the power shaft of this mechanism meshing with the other gear on the main spindle, and operative connection between said work shaft of this mechanism and said lead screw of the lathe.

41. The combination with a main spindle and a lead screw of a lathe, of variable speed mechanism forming operative connection therebetween and comprising a series of shafts and means to effect primary, ternary and quinary combinations of said shafts.

42. The combination with a main spindle and a lead screw of a lathe, of variable speed mechanism for driving said main spindle, and another variable speed mechanism forming operative connection between the main spindle and the lead screw, each of said mechanisms comprising a series of shafts and means for effecting primary, ternary and quinary combinations of said shafts in the respective mechanisms.

43. The combination with the main spindle and a plurality of rotary feeding elements thereof, of a variable speed mechanism driven by said main spindle, and means for alternatively connecting said mechanism to either of said feeding elements, said mechanism comprising a series of shafts and means for effecting primary, ternary and quinary combinations of said shafts.

ALPHEUS FAY.

Witnesses:
CLARENCE PERDEW,
W. McGLINNEN.